(12) United States Patent
Pelletier et al.

(10) Patent No.: US 7,359,502 B2
(45) Date of Patent: Apr. 15, 2008

(54) SYSTEM FOR PROVIDING NETWORK INFORMATION SERVICE USING CID-TYPE MESSAGES

(75) Inventors: Karen Jeanne Pelletier, Crystal Lake, IL (US); Laura Marie Griffith, Dundee, IL (US); Michael Steven Pickard, Highland Park, IL (US); Gayle Roberta Ekstrom, Chicago, IL (US); Robert Welsey Bossemeyer, Jr., St. Charles, IL (US); Raymond Walden Bennett, III, Naperville, IL (US); Jordan Howard Light, Mt. Prospect, IL (US); Edmond W. Israelski, Lake Barrington, IL (US); Bruce Edward Stuckman, Algonquin, IL (US)

(73) Assignee: AT&T Knowledge Ventures, L.P., Reno, NV (US)

( * ) Notice: Subject to any disclaimer, the term of this patent is extended or adjusted under 35 U.S.C. 154(b) by 0 days.

(21) Appl. No.: 11/103,323

(22) Filed: Apr. 11, 2005

(65) Prior Publication Data

US 2005/0175163 A1    Aug. 11, 2005

Related U.S. Application Data

(60) Division of application No. 10/616,619, filed on Jul. 10, 2003, now Pat. No. 6,920,211, which is a continuation of application No. 09/270,890, filed on Mar. 15, 1999, now Pat. No. 6,608,891.

(51) Int. Cl.
*H04M 7/00* (2006.01)
*H04M 3/42* (2006.01)

(52) U.S. Cl. ............. 379/229; 379/207.02; 379/221.08
(58) Field of Classification Search ........... 379/201.01, 379/207.02, 207.04–207.07, 221.08, 229, 379/230, 242, 142.01–142.18
See application file for complete search history.

(56) References Cited

U.S. PATENT DOCUMENTS

| | | | |
|---|---|---|---|
| 4,554,418 A | 11/1985 | Toy | 379/88.01 |
| 4,811,382 A | 3/1989 | Sleevi | 379/67.1 |
| 5,131,020 A | 7/1992 | Liebesny et al. | 455/422 |
| 5,260,986 A | 11/1993 | Pershan | 455/413 |
| 5,557,658 A * | 9/1996 | Gregorek et al. | 379/88.25 |
| 5,559,867 A | 9/1996 | Langsenkamp et al. | 379/69 |
| 5,583,564 A | 12/1996 | Rao et al. | 348/14.01 |
| 5,651,053 A | 7/1997 | Mitchell | 379/210.02 |
| 5,652,784 A * | 7/1997 | Blen et al. | 379/67.1 |
| 5,659,605 A | 8/1997 | Voit et al. | 379/197 |
| 5,809,119 A | 9/1998 | Tonomura et al. | 379/114.05 |
| 5,838,768 A | 11/1998 | Sumar et al. | 379/88.14 |
| 5,870,454 A | 2/1999 | Dahlen | 379/88.14 |
| 5,937,037 A * | 8/1999 | Kamel et al. | 379/88.19 |
| 5,978,450 A | 11/1999 | McAllister et al. | 379/88.02 |
| 6,038,305 A | 3/2000 | McAllister et al. | 379/201.02 |
| 6,167,119 A | 12/2000 | Bartholomew et al. | 379/88.04 |
| 6,223,029 B1 | 4/2001 | Stenman et al. | 455/420 |
| 6,681,257 B1 | 1/2004 | Patel et al. | 709/245 |

* cited by examiner

Primary Examiner—William J. Deane, Jr.
(74) Attorney, Agent, or Firm—Jackson Walker L.L.P.

(57) ABSTRACT

A network-based announcement and message delivery service for providing a landline customer with information of interest such as weather, financial market data, time/temperature, sporting event results, etc. The information is provided to the subscriber by way of information displayed on a caller-ID display and/or by way of talking caller-ID.

10 Claims, 9 Drawing Sheets

SYSTEM FOR PROVIDING NETWORK INFORMATION SERVICE USING CID-TYPE MESSAGES

RELATED APPLICATIONS

This application is a divisional of U.S. patent application Ser. No. 10/616,619 filed Jul. 10, 2003 now U.S. Pat. No. 6,920,211; which is a continuation of U.S. patent application Ser. No. 09/270,890 filed Mar. 15, 1999, now U.S. Pat. No. 6,608,891.

TECHNICAL FIELD

The present invention relates generally to telecommunications services and, in particular, providing audio information through the telephone system.

BACKGROUND OF THE INVENTION

Automated and quick access to various types of data is an increasingly important requirement in today's society. In particular, with the increasing popularity of wireless telephones and pagers, consumers have generally instant access to a wealth of information, quite literally at their fingertips. Furthermore, these same consumers demand ease of access with a minimum of effort. As such, services that provide simplified access to a variety of information are available.

Among the best known of such information services, is the simple consumer dial-up line. In such a service, a caller dials a particular number to access a database of information pertaining to potentially hundreds of different topics, such as finance, sports, soap operas, health topics, etc. Typically, the database includes a front end much like an interactive voice response (IVR) system, wherein the caller is greeted by a message welcoming the caller to the service. After providing some brief instructions, the caller is asked to enter either the number for the exact topic in which the caller is interested, or to enter a general subject number from where the caller is informed of the various topics under that general heading. The caller may then select from one of the presented topics. After selecting the topic, the information system provides current information to the caller regarding the particular information the caller is seeking. Unfortunately, the caller is required to dial up the service each time newly updated or different information is desired. Furthermore, the caller is, in many cases, required to leaf through a telephone book in an attempt to find the number for the information the caller is seeking. Depending upon the number of topics offered, the listing can be extremely large and cumbersome to review.

Recently, pagers and paging service providers also have begun offering information services to their subscribers. In particular, the subscriber purchases or leases an alphanumeric pager and enters into a contract with a service provider. The pager, in addition to performing standard paging functions, is also able to provide various types of information, such as sports scores, stock market information and the like, depending on the subscribers requirements. The information is provided at specified intervals or upon a change in status of the requested information, such as the score of a basketball game changing. Typically, like any other time the pager receives a message, the subscriber's pager beeps, vibrates or lights. The message, in the above example, instead of being the telephone number and/or a message from a caller, is the information desired by the subscriber and provided by the service provider. In certain instances, however, a person may be unwilling to carry a pager or spend additional money in purchasing or leasing a pager. In particular, if a person is interested in receiving information only when at home, subscribing to pager services may not be worthwhile.

Accordingly, there is a need for a system that provides an information service that enables a subscriber to quickly obtain desired information without requiring that the subscriber memorize numbers or spend additional money on hardware.

BRIEF DESCRIPTION OF THE DRAWINGS

The invention is pointed out with particularity in the appended claims. However, other features of the invention will become more apparent, and the invention will be best understood by referring to the following detailed description in conjunction with the accompanying drawings, in which:

DETAILED DESCRIPTION OF THE INVENTION

The present invention relates to a network-based announcement and message delivery service that provides a landline customer with up-to-date information of interest. Subscribers are able to obtain information such as weather, financial market data, time/temperature, sporting event results, etc. A particular advantage of such a system is that a subscriber does not need to initiate a telephone call to obtain the information.

According to one embodiment of the present invention, an advanced intelligent network (AIN) is configured to provide a selectively enabled information service for delivering information to a party who has subscribed to the service, but without requiring the subscriber to initiate a call. The network information service provides information to a subscriber who simply lifts the handset of the telephone. The subscriber instead of hearing a dial tone hears the information in the form of streaming audio.

In another embodiment of the invention, information is provided to the subscriber by way of information displayed on a caller-ID display and/or information provided by way of talking caller-ID.

Figure 1:
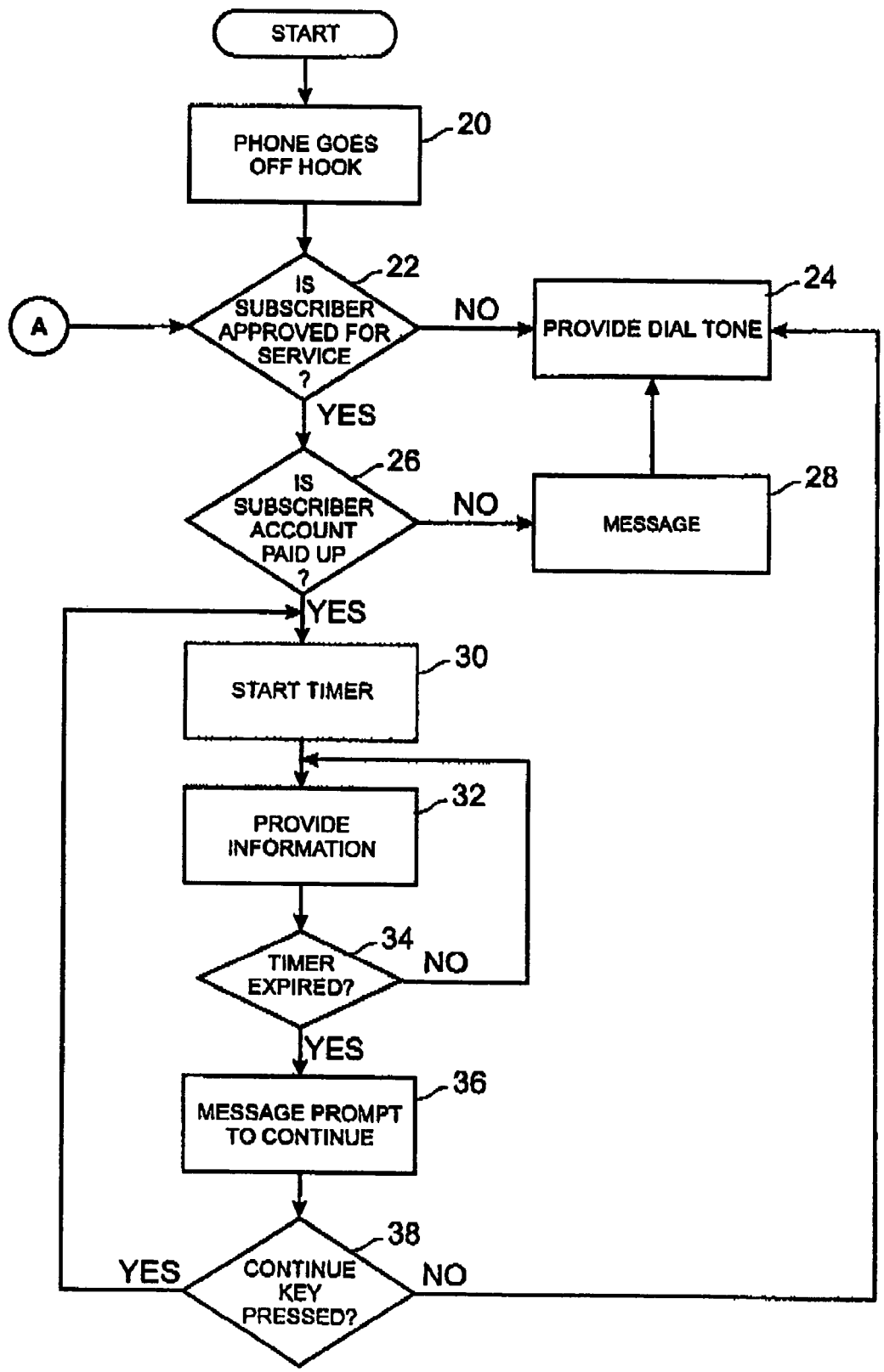
FIG. 1 shows a flow chart illustrating a method of operating a network information service in accordance with an embodiment of the present invention.

Turning now to the drawings, and in particular to FIG. 1, there is illustrated a flow chart diagram describing the operation of a network information service in a telecommunications system in accordance with an exemplary embodiment of the present invention. In step 20, a subscriber lifts the handset of the telephone off its cradle and enters an off-hook condition. In step 22, while the telephone is off-hook, a check is made to determine whether the off-hook party has subscribed to the service and is included in the subscriber list in the SCP 18. If the off-hook party is not identified in the list, then in step 24 the party receives a dial tone and the party may proceed to complete the call as normal. Once the subscriber has been identified as being present on the subscriber list (step 22) a check is made as to whether the subscriber's account is current (e.g., paid up) in step 26. If not, then in step 28 a message is played indicating that the service is unavailable. Subsequently, the system returns to step 24 and a dial tone is optionally provided. If, however, the subscriber is authorized to receive the service, an optional timer is started in step 30 and streaming audio information is provided instead of a dial tone in step 32.

After a predetermined amount of time, or upon timer expiry in step 34, a message in the dial tone requests the press of a predetermined key to enable the system to continue providing information in step 36. If the required key is not pressed within a certain time in step 38, then the system returns to step 24 and provides a dial tone and normal call processing occurs. In a particular aspect of the present embodiment, the timer and thus recognition of timer expiry may be eliminated so that the subscriber may listen to the information as long as desired without interruption. To place a call, or dial a command string like *69 for automatic call back, the subscriber at any time simply presses the appropriate key and breaks the dial tone, thereby shutting the streaming audio off. After the number or command is dialed, the call is processed.

To ensure compatibility with certain facsimile machines, modems and other telecommunications devices that operate using dial tone detection, a feature code, such as *90, is provided to disable the streaming audio. Typically, if such telecommunications devices do not detect a dial tone immediately upon going off-hook, any dialing process is aborted. To prevent such an occurrence, *90 is manually dialed by the subscriber using a telephone to disable the streaming audio and enable dial tone prior to using the telecommunications device. After finishing use of the modem or facsimile machine, the subscriber reactivates the streaming audio dial tone by dialing *91. Alternatively, the streaming audio may automatically default into active mode once the device goes on-hook. In certain instances, a number of telecommunications devices are available that do not use, or optionally disable, dial tone detection before dialing. In such cases, the device dials the destination telephone number without first listening for a dial tone. The call then proceeds similar to any other data call.

Figure 2:
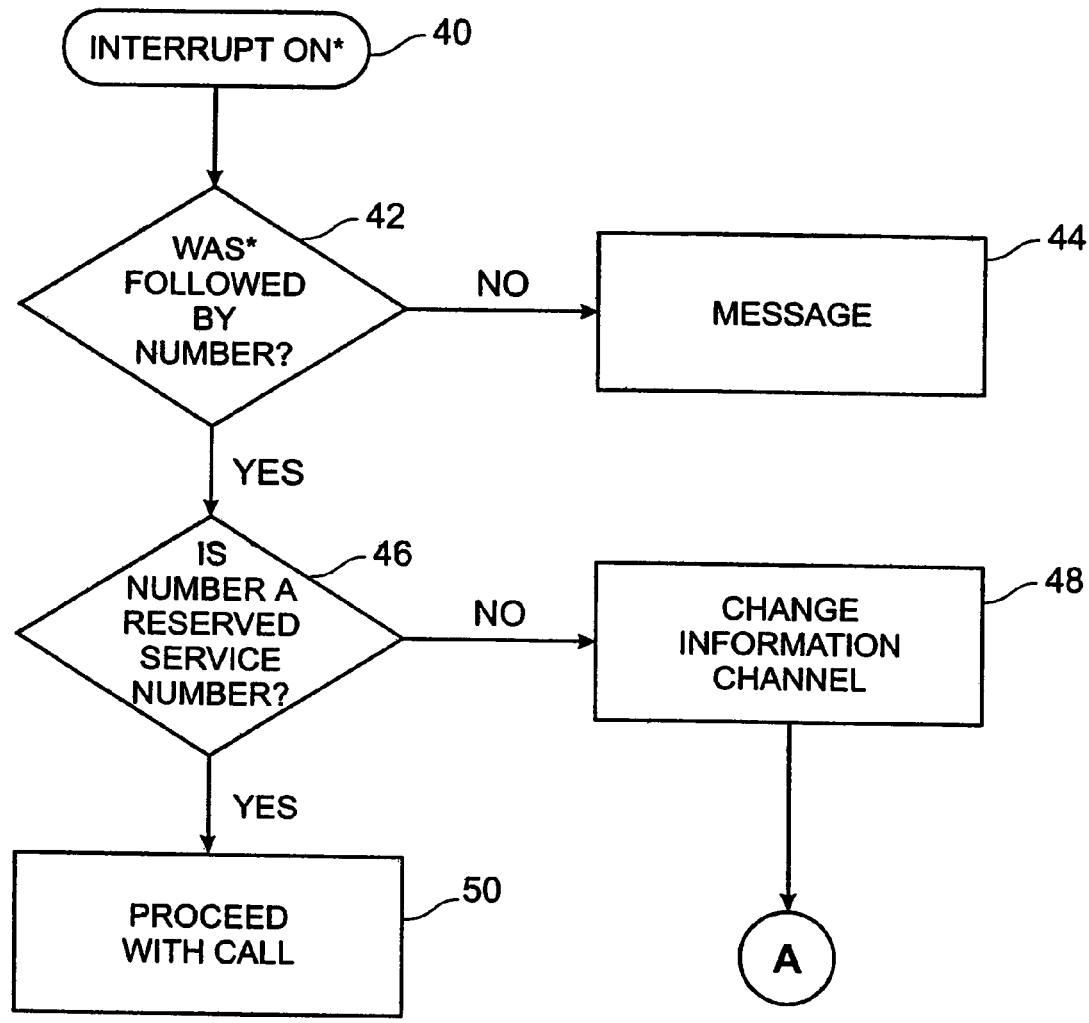
FIG. 2 shows a flow chart diagram illustrating operation of the information providing system after receiving a first predetermined interrupt.

In another aspect of the present embodiment, referring to FIG. 2, the system is shown wherein the press of the asterisk or "star" key, or any other predetermined feature invoking key, interrupts the dial tone information stream to enable the subscriber to request provision of different information. For example, in step 40, when the subscriber presses the star key, the provided information stream is interrupted and the SN/IP 20 begins monitoring the line for additional DTMF tones in step 42. If no tones are entered within a predetermined time, the subscriber will receive a message in step 44. Alternatively, if the star key is not followed by an entry, a watchdog timer in the SN/IP 20 times out and sends a message to the SCP 18. The SCP 18 then causes a message to be sent from the SCP 18 to the SSP 14 instructing the SSP 14 to provide a pertinent message to the subscriber. Alternatively, depending on the carrier's default preference, the previous information can continue streaming. It is to be noted that the SN/IP 20 may provide the messages to the SSP 14 directly.

If tones are entered, the SN/IP 20 decodes any received DTMF tones entered by the subscriber to determine in step 46 whether the number following the star is a number that corresponds to a request for different information or is a reserved feature number, such as *70 (for turning off call waiting). If the SN/IP 20, in step 46 determines that the number following the star is a reserved feature number, the SN/IP 20 informs the SCP 18, which then sends a message to the SSP 14 instructing the SSP 14 to process the entered feature and proceed with regular call processing in step 50. However, if the star key is followed by an information service number, the SN/IP 20 accesses its database and begins streaming the information that is newly requested by the subscriber in step 48. The system then returns to step 30 (FIG. 1). The SN/IP 20 continues to provide the requested information until the subscriber hangs up the phone, makes a call or interrupts to enter a feature number or request still other information.

In another aspect of the present embodiment, the above described aspects of the invention may be combined. In such a combination, the system monitors the content being provided to the subscriber to provide greatly enhanced features. For example, the dial tone may be streaming audio of sports scores for on-going games. Upon hearing a score of interest, the subscriber presses a feature code, such as *99, to access the information service followed by the pound (#) key, thereby automatically selecting the live audio broadcast of the game in process. Similarly, in a more commercial example, the dial tone information may sponsored by advertisers who stream information regarding their products. As such, for example, if the subscriber wishes to purchase the product being advertised, pressing *99# provides the subscriber with an expanded description of the advertised product with an offer to have the retailer call the subscriber or directly connect the subscriber to the retailer. Thus, it can be seen that the system monitors the informational audio being sent to the subscriber before *99 is pressed and provides a shortcut to reach related information.

In another example, the streaming audio dial tone is used to alert users to waiting voice mail. Again, when the subscriber hears a message indicating that there is waiting voice mail, the subscriber dials *99# and is directly connected to the voice mail system. The voice mail example may also be used in applications where E-Mail may be accessed using the telephone. In a similar application, subscribers are notified of missed calls through the dial tone information. For example, subscribers hear the telephone number of a missed call and the time the call was received. Automatic call back to the missed number is then effected by dialing *99#. A particular advantage of such a system is that the subscriber is explicitly made aware of any missed calls along with caller information. In contrast, existing caller-ID devices list all calls that are placed to the subscriber's telephone, whether answered or not. In such a situation, if the caller-ID memory was not cleared, the subscriber must cycle through each of the names and times to determine if and when a call was missed. Similarly, automatic call back (usually activated by pressing *69) requires the subscriber to actually engage the service to determine the telephone number of the last caller. The subscriber must then determine whether the last call was indeed a missed call.

In another aspect of the above embodiment, *99 enables the subscriber to access an audio menu to select information of interest. From the menu the subscriber then selects, through the press of one or more additional keys, the type of information desired in the dial tone information stream. Similarly, the menu may also be programmed to include a number of pay-per-use services, such as the automatic call-back service described above. The advantage in such a system is that the audio information service is accessed by simply dialing three characters rather than a seven or ten digit number and is also capable of talking to network switching and control entities.

Figure 3:
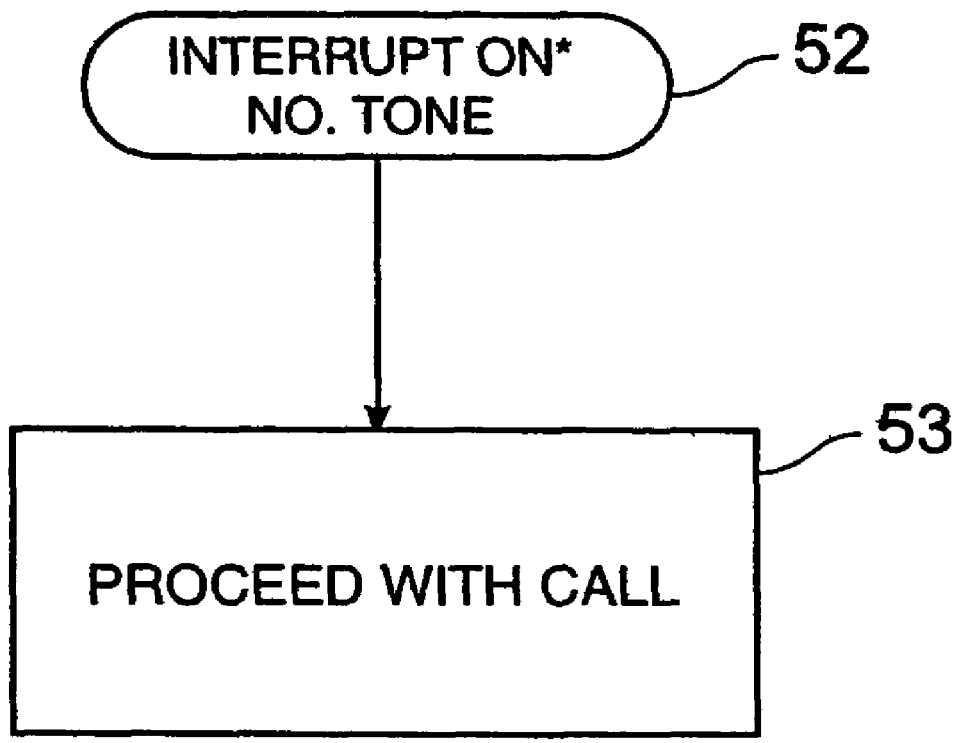
FIG. 3 shows a flow chart diagram illustrating operation of the information providing system after receiving a second predetermined interrupt.

Referring to FIG. 3, the system is shown in an interrupt state based on the dialing of a numeric number, such as a telephone number. In particular, if a non-symbol key is pressed in step 52, such as a numeric digit key for dialing a telephone number, the SSP 14 immediately takes control of the system and proceeds with the call in step 53 as if the call had been dialed normally. Alternatively, if a non-symbol key is pressed, the SN/IP 20 recognizes that numeric digits are being entered and notifies the SCP 18. A message is then sent from the SCP 18 to the SSP 14, which then instructs the SSP 14 to provide standard call processing.

Although both methods of interrupting the audio information dial tone mentioned above provide fairly similar levels of service, call processing is possibly slightly faster in the first scenario. In the first example, the SSP 14 and the SN/IP 20 operate in a bridged mode wherein both the SSP 14 and the SN/IP 20 monitor the line for DTMF entries. Thus, if a numeric entry is made, such as when the subscriber is dialing an actual telephone number, the SSP 14 directly handles such situations and processing of the telephone call is faster. A particular use of the bridged mode is to enable faster call processing of emergency numbers, such as 911. Optionally, the SN/IP 20 is also provided with voice recognition capabilities such that the audio data stream is interrupted based on a predetermined voice command.

Figure 4:
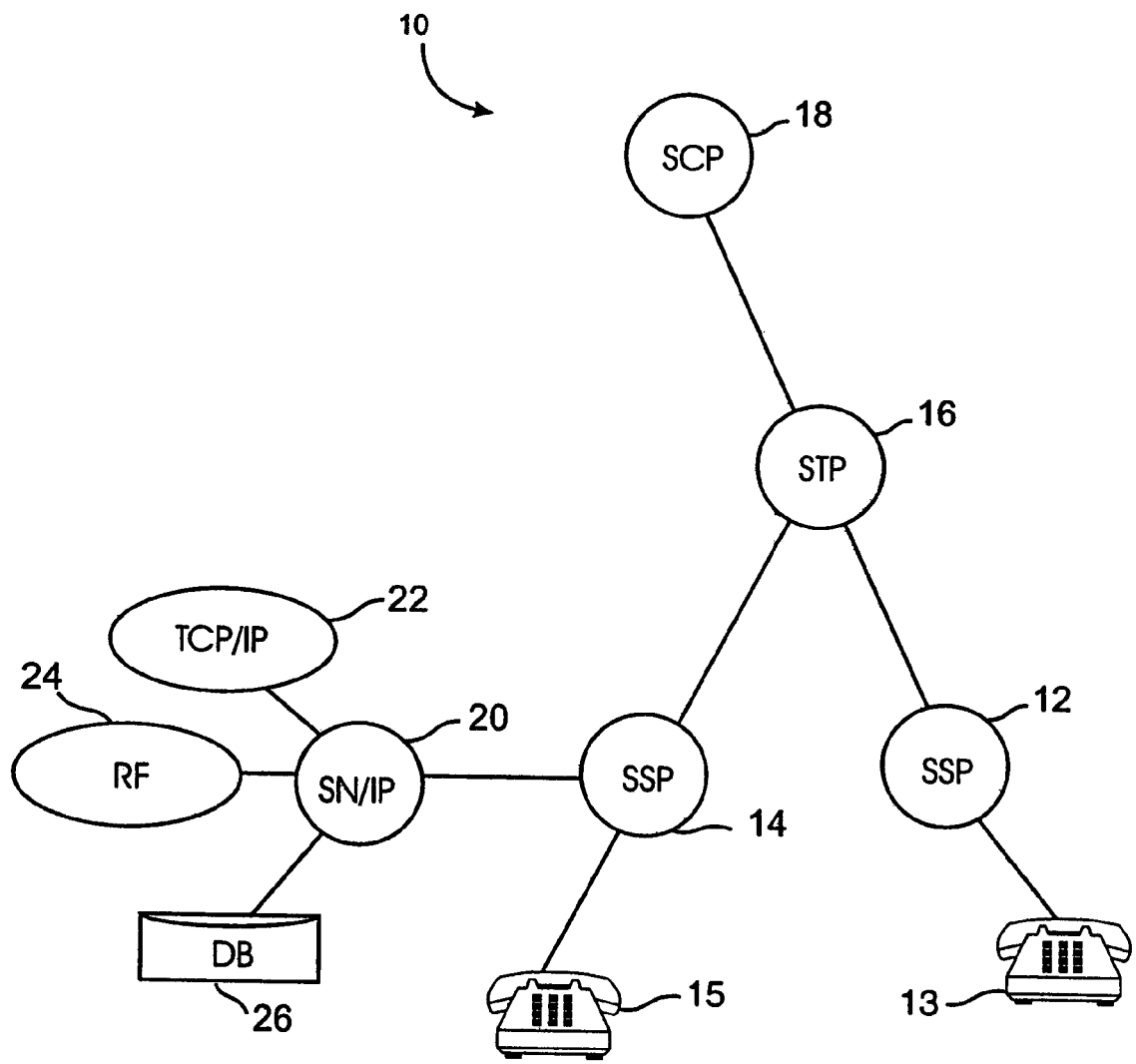
FIG. 4 is a block diagram illustrating a telecommunications system in accordance with an exemplary embodiment of the present invention.

Turning now to FIG. 4, the telephone network used in the present invention is shown. The network uses common channel signaling (CCS) for communication between the SSPs 12, 14 to the STP 16 and from the STP 16 to the SCP 18. CCS is an out-of-band signaling method that utilizes packet switched network to allow messages to be transported on a dedicated high-speed data network, separate from the voice or data communications path. The public switched network utilizes the CCS network, using signaling systems 7 (SS7) protocol to send messages between network elements regarding call set-up, line status, caller identification, and other network data, including AIN inquiries. IP information is delivered on the circuit established as a result of the SS7 signaling and network processing of that signaling.

The use of SS7 on the CCS network by the public switched network has become nearly universal for signaling between network elements; thereby supplanting circuit associated signaling. In typical operation, once a user establishes a connection with their central office, the central office's SSP functionality packages the signaling information related to the call (e.g., the dial telephone number) into an SS7 message, and sends the message on the CCS network to the STP 16. The STP 16 routes the message to the appropriate SSPs, which negotiate the establishment of a circuit between the central offices, and the connection to the distant party is made.

As shown in FIG. 4, the system 10 includes an originating SSP 14, a terminating SSP 12, a STP 16, a SCP 18, a SN/IP 20, caller premises equipment (CPE), such as called telephone station 13 and calling telephone station 15. Intelligent network system components, such as AIN components, suitable for implementing the present invention are commercially available from several vendors and are known to those skilled in the art.

Each of the SSPs 12, 14 include an AIN switch that routes calls, recognizes and responds to triggers, generates queries to obtain call information and response to returned call information. The functionality of the SSPs 12, 14, as disclosed herein, is implemented using any AIN compatible switch such as a 5ESS switch, with generic 5E11 update or better, available from Lucent Technologies, Inc. The SSP 14 connects the called telephone station 13 with the SSP 12 to enable a call to be placed between called telephone station 13 and calling telephone station 15. The SSPs 12, 14 communicate with the STP 16 and the SCP 18 using the SS7 protocol as described above.

As is known in the art, the STP 16 is a packet switch used to route signalling messages within the network. In particular, the STP 16 includes a network element that transfers signalling communications in response to signalling protocols such as SS7 or other such signalling protocols. The STP 16 transfers queries from the SSPs 12, 14 to the SCP 18 and transfers responses to the queries from the SCP 18 to the SSPs 12, 14.

The CPE 13, 15 generally includes analog telephone sets, as mentioned above. In addition, the CPE 13, 15 may also include PCS, ISDN or any other form of communication station known.

The SCP 18 includes an AIN element that stores call information and receives and responds to queries. The SCP 18 is any commercially available AIN node which contains the service logic and associated data support to execute the required customer services. For example, the SCP 18 may be a Model I or Model II, available from Lucent Technologies, Inc. The SCP 18 stores call control information in an internal database and accesses the stored call control information as needed. The SCP 18 then forwards the call control information to the SSPs 12, 14. The SCP 18 receives queries generated by the SSPs 12, 14 and responds to the queries by performing database searches to locate the requested call control information.

The SN/IP 20 is a computer or a communication server linked by an open interface to the originating SSP 14. In the example shown, the SSP 14 and the SN/IP 20 communicate by the ISDN network connection. The ISDN connection is implemented using either ISDN-BRI (basic rate interface) or ISDN-PRI (primary rate interface) protocols that are known in the art. The SN/IP 20 contains and manages resources required to offer services and service enhancements to network users. The SN/IP 20 is connected to a TCP/IP interface 22, a radio frequency (RF) interface 24 and a database 26. Generally, the SN/IP 20 is used to obtain information through a variety of sources. Such sources include, among others, information obtained through the RF interface 24 and/or information obtained through the TCP/IP connection 22 via the internet. The information once received by the SN/IP 20 is saved in the database 26 from where information is sent through to subscribers. The RF interface 24 is used to receive generally the same type of information transmitted by paging services to their subscribers. A particular advantage of the present invention is the ability to provide dynamic information to the subscriber. Although prior art telephone systems are known to provide prerecorded static information, the present invention enables the system to receive current information, such as sports scores and stock market information, update its databases and provide the information in a dynamic manner to the subscriber. Accordingly, the subscriber receives the latest information and is kept abreast of any changes in the information. The SN/IP 20 optionally includes text-to-speech capabilities for converting text-based information received through the internet into an audio format suitable for streaming as audio through the telephone connection.

In an AIN-type system, such as shown in FIG. 4, certain calls receive specialized AIN-type processing under control of data files stored in the SCP 18. In such a network, the SSP 14-type local offices of the public telephone network detect a call-processing event known as an AIN trigger. For ordinary telephone service calls, there would be no event to trigger AIN processing and the local and toll office switches would function normally and process such calls as discussed above, without referring to the SCP 18 for instructions. However, a SSP in a central office which detects a trigger suspends all call processing, compiles a formatted call data message and forwards that message via the CCS network and the STP 16 to the SCP 18. If needed, the SCP 18 instructs the central office to obtain and forward additional information. Once the SCP 18 receives sufficient information about the call, the SCP 18 accesses its stored data tables to translate the received message data into a call control message and returns the call control message to the office of the network via the CCS network and the STP 16. The SSP 14 then uses the call control message to complete the particular call to the network. A particular advantage of the present invention is the ability of the SN/IP 20 to provide communication services on the subscriber's telephone line and to transfer control quickly to an SSP 74 that controls routing of calls for the line if the subscriber wishes to make a telephone call.

The SSP-type switches 12, 14 recognizes a variety of events as triggers for activating a query and a response-type AIN interaction with the SCP 18. In particular, the originating SSP 14 uses an off-hook immediate trigger to signal the SN/IP 20. In addition, the SSP 12 provides announcements to subscribers depending on particular problems or scenarios that are encountered. A particular embodiment of the invention uses an off-hook immediate trigger to initiate AIN-type call processing. Specifically, when a person picks up the handset of a telephone connected to one of the lines of the group, the SSP 14 connected to that line accesses its translation tables and recognizes that the line is subject to AIN processing. Upon determining that a subscriber is subscribed to the information service, the SSP 14 provides information in a constant audio stream instead of the dial tone. The subscription list is updated to include or delete a subscriber's entry as required.

Figure 5:
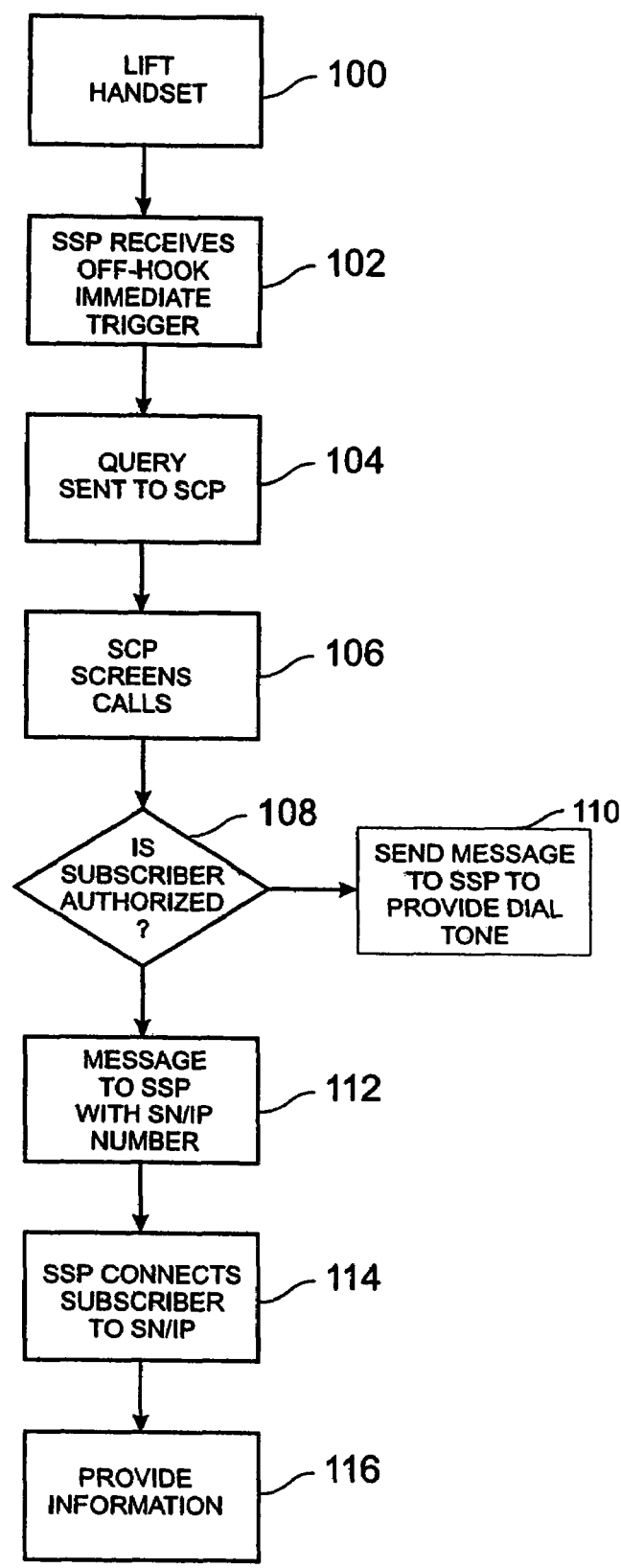
FIG. 5 shows an event diagram depicting caller indication of the network information service available from the system of FIG. 2.

FIG. 5 shows an event diagram depicting the indication of message delivery service in the AIN system of FIG. 4. Initially, in step 100, the subscriber lifts the handset and goes off hook. An off-hook immediate trigger is received by the originating SSP 14 in step 102, which then sends a query to the SCP 18 in step 104. As mentioned above, such communication uses conventional SS7 protocol. In response to the query, the SCP 18 in step 106 screens the call to determine whether the party is a subscriber to the information service. If it is determined in step 108 that the subscriber is authorized to receive the selected service, the SCP 18 sends an analyzed route message to the SSP 14 in step 112, wherein the analyzed routed message includes a called number parameter which is then sent to the number of the SN/IP 20. If the subscriber is not authorized, then in step 110, the SCP 18 sends a message to the SSP 14 to provide dial-tone to the subscriber. In step 114, upon receiving the analyzed-route message, the SSP 14 connects the subscriber to the SN/IP 20. The SN/IP 20 then, in step 116 provides the information to the subscriber in the form of streaming audio information that is provided to the subscriber instead of dial tone. The subscriber is able to initiate and complete a telephone call at any time by simply dialing the appropriate number of the party that the subscriber wishes to contact, as further described below.

Figure 6:
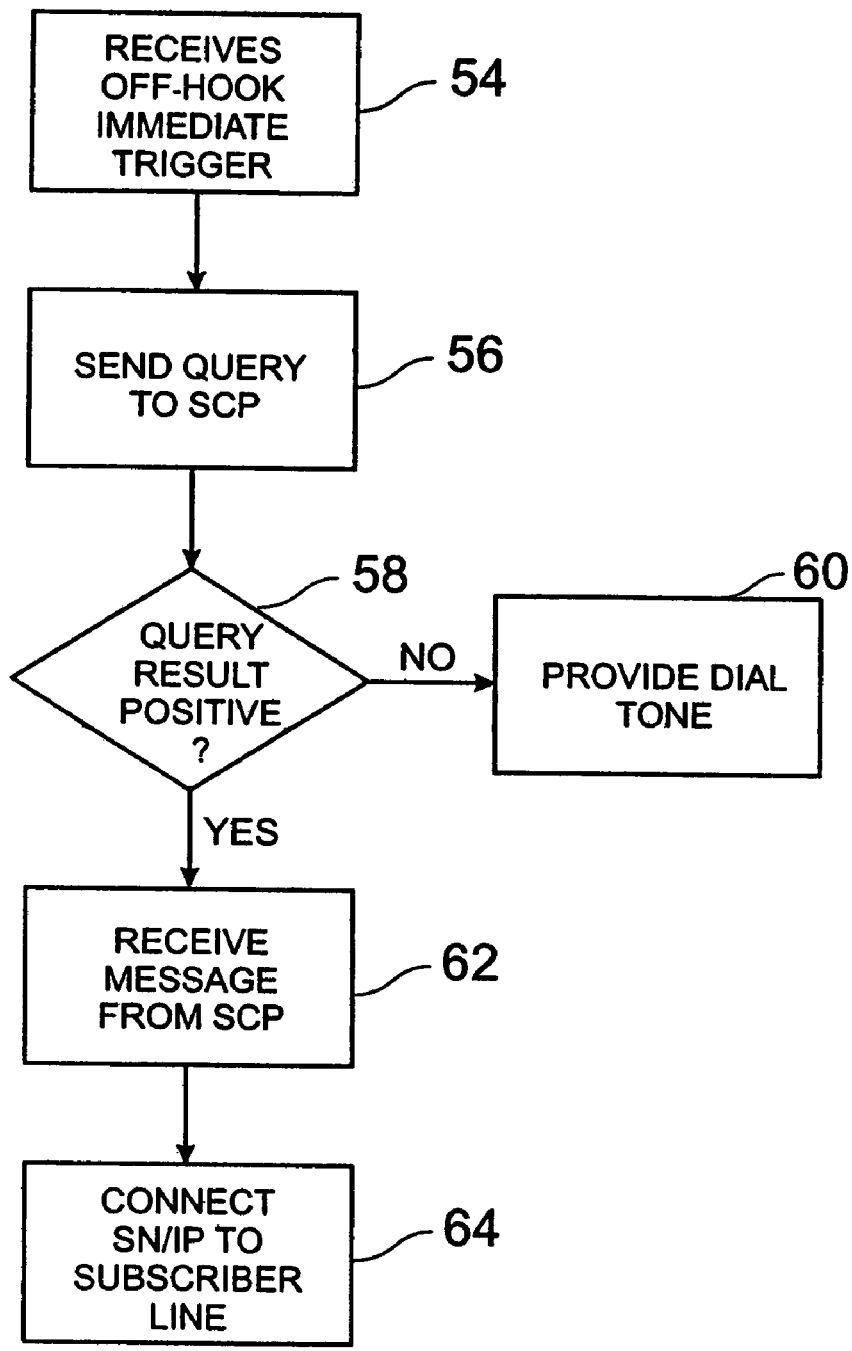
FIG. 6 shows a flow chart diagram illustrating the operation of the originating service switching point (SSP) of FIG. 2 in accordance with an embodiment of the invention.

FIG. 6 shows a flow chart diagram of a method of operating the originating SSP 14 shown in FIG. 4. In step 54, the SSP 14 detects an off-hook condition generated by the caller CPE 15, such as a telephone. The SSP 14 does not provide a dial tone at that time. Instead, the SSP 14 in step 56 launches a query to the SCP 18. The query contains a substantial amount of information, including data identifying the off-hook line. The SCP 18 uses the line identification data to cross-reference the subscriber's data file within the SCP 18 database. Based on the obtained results, the SCP 18 determines what action to take next and then provides a response to the SSP 14 in step 58. If the SSP 14 responds with a continue message, the information service is not invoked and the SSP 14 provides the subscriber with dial tone in step 60. Call processing then proceeds as normal. However, if the SCP 18 transmits a "Send to Resource" message to the SSP 14 in step 62, the information service is offered to the subscriber. In particular, the SSP 14 upon receiving the message, attempts to connect the caller to the SN/IP 20 in step 64, as described further below.

Figure 7:
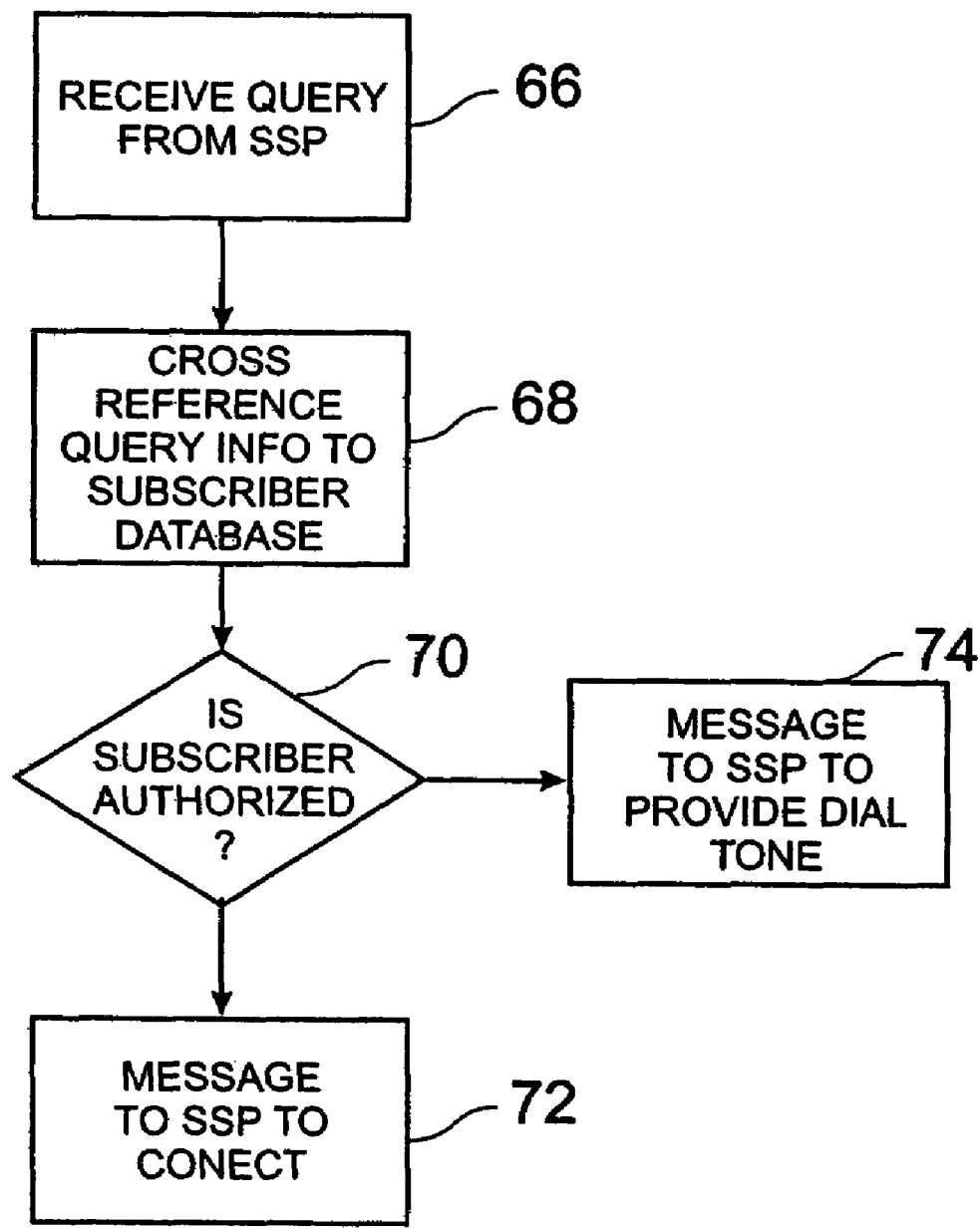
FIG. 7 shows a flow chart diagram illustrating a method of operation the originating service control point (SCP) of FIG. 2 in accordance with an embodiment of the present invention.

FIG. 7 shows a flow chart illustrating a method of operating the originating SCP 18 shown in FIG. 4. The primary function of the SCP 18 is to control the service and to screen calls by comparing caller/called party information to predetermined criteria. To provide the information delivery service, the SCP 18 communicates with the SSP 14 and provides control information to enable the subscribed information to be provided to the subscriber as information audio instead of dial tone. In particular, the operation of the SCP 18 commences upon the SSP 14 receiving an off-hook immediate trigger. In step 66, the SSP 14 queries the SCP 18 to determine whether the subscriber is present on the subscriber list in the SCP 18 in step 68. As described above, the subscriber list is a database file containing information for identifying parties that have subscribed to the messaging service to deliver caller information to them. After accessing the subscriber list, the SCP 18 determines in step 70 whether the subscriber is authorized to receive the information delivery service. If so, then in step 72, the SCP 18 sends a message to the SSP 14 instructing it to make a connection to the SN/IP 20. Accordingly, the SN/IP 20 starts or continues to provide the subscribed information to the subscriber. If the subscriber is not authorized, then in step 74, the SCP instructs the SSP to provide dial tone for standard call processing.

Figure 8:
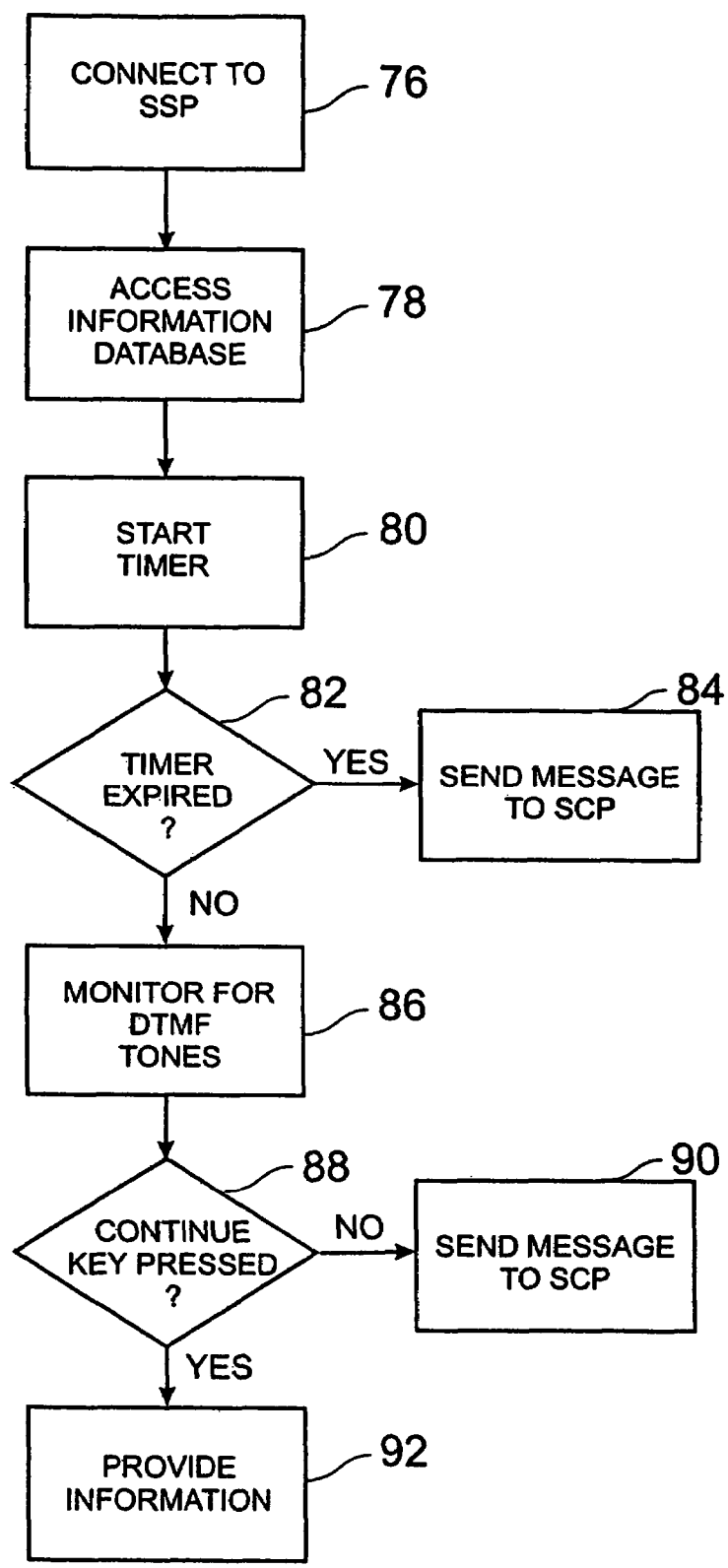
FIG. 8 shows a flow chart diagram illustrating a method of operating the service node/intelligent peripheral (SN/IP) of FIG. 2 in accordance with an embodiment of the present invention.

FIG. 8 depicts a flow chart illustrating a method of operating the SN/IP to provide the information delivery service as a dial tone stream. Under the delivery service, the SN/IP 20 commences the operation when the SSP 14 connects the subscriber thereto in step 76. The SN/IP 20 accesses its database in step 78 and gathers the information to which the subscriber is subscribed. In step 80, the SN/IP 20 starts an internal watchdog timer and begins to provide the information to the subscriber in the form of streaming audio information instead of dial tone. The information is provided for a predetermined amount of time until the timer expires, as determined in step 82. Upon expiration of the timer, the SN/IP 20 sends a message to the SCP 18 in step 84. The SCP 18 then sends a message to the SSP 14 instructing the SSP 14 to provide a message to the subscriber indicating that a particular continue key, such as the "pound" key, must be pressed if the information stream is to continue. In step 86, the SN/IP 20 monitors the line for dual tone multi frequency (DTMF) tones corresponding to the continue key. If the continue key is not pressed within a predetermined amount of time in step 88, the SN/IP 20 sends a message to the SCP 18 in step 90, which in turn sends a message to the SSP 14. As a result, the SSP 14 either plays a message indicating that the provided information stream has been terminated or provides a dial tone to enable regular call processing. However, if the continue key is pressed in a timely manner, the streaming dial tone information continues to be provided in step 92.

It is to be noted that although an AIN based solution is discussed in the above exemplary embodiments, the present invention may also be implemented using a streaming dial tone generator. For example, known systems provide dial tone by having the line card connect to a dial tone generator that plays dial tone over the line. As discussed above, when the line card detects a user keypress, it disconnects the dial tone generator and connects to a device that collects touch-tone digits. In an alternate embodiment of the present system, the dial tone generator could be replaced by a streaming audio dial tone generator at each CO that would provide streaming audio instead of the normal dial tone.

Figure 9:
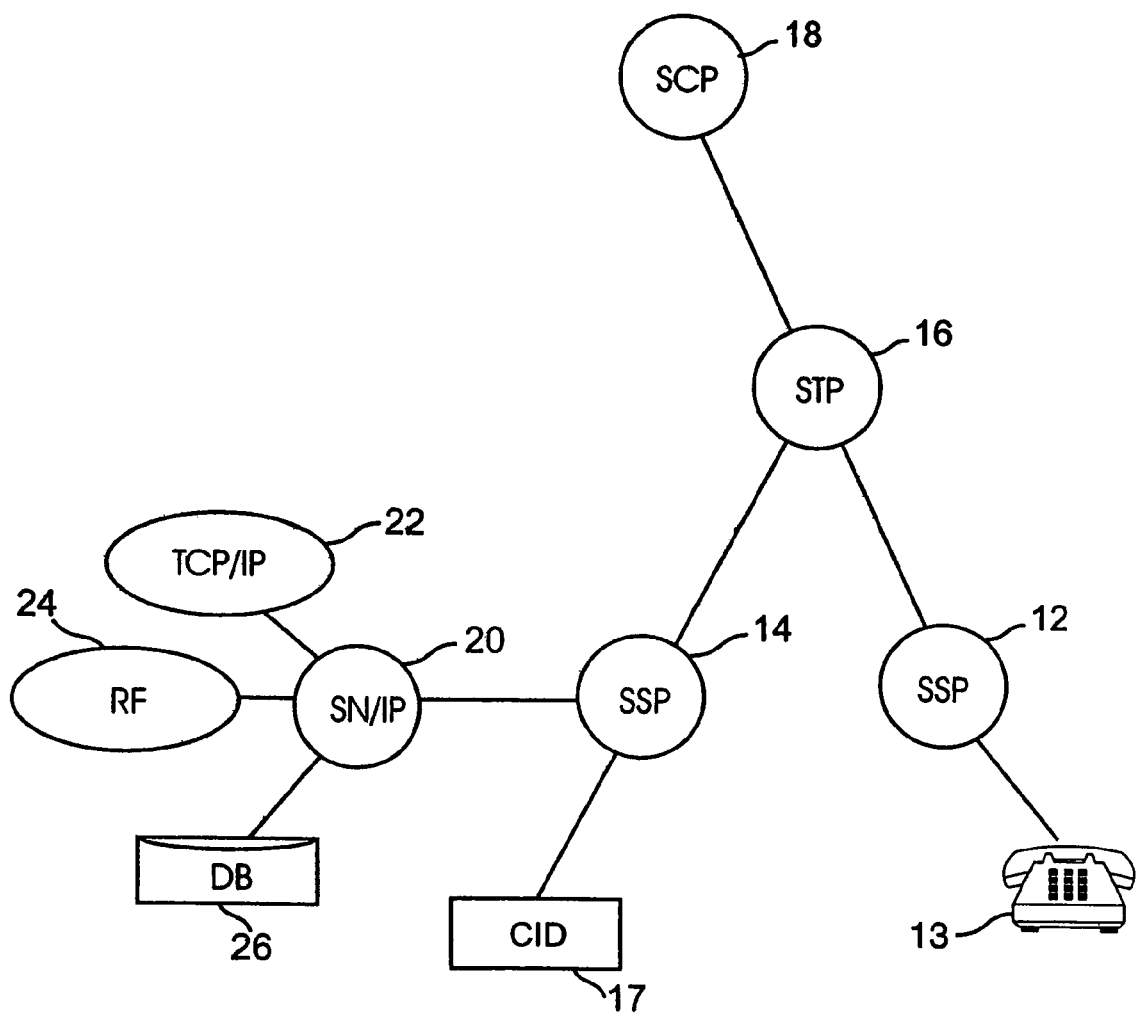
FIG. 9, is a block diagram illustrating a telecommunications system having a caller identification (CID) unit in accordance with an exemplary embodiment of the present invention.

In another embodiment of the invention, as shown in FIG. 9, the system is shown in operation using a caller identification (CID) unit. In particular, the subscriber is able to receive information by way of the display on a CID unit 17. For example, information such as stock quotes, sports scores and the like is displayed on the CID unit 17 where caller information, such as name and phone number, normally can be seen. Optionally, the CID unit 17 may be a speech synthesizer unit to audibly output the received subscriber information.

Typically, caller-ID systems operate by providing caller information to the call receiving party on a display. CID information is typically provided as a 1200 baud, 7 data bits and 1 stop bit data stream that is transmitted to the receiving party after the first ring, but before the second ring. Basic CID generally supplies only the calling number and date whereas enhanced CID further provides directory information such as the name of the caller. Typically, CID information is displayed as three lines of fifteen characters.

In the present embodiment, because the subscriber never takes the phone off-hook, no trigger is sent or processed by the SSP 14. However, depending on the type of service provided, information is provided to the subscriber, for example, at predetermined intervals (e.g., every hour), as an alarm (e.g., information at 7:00 o'clock in the morning) or each time a change in the subscribers information is detected (e.g. the Chicago Cubs score a run). The information is provided on the subscriber's CID unit 17 display. In addition, because the telephone rings as well, the subscriber is alerted that information is available for viewing on the CID unit 17.

In operation, the SN/IP 20 monitors the data received from the TCP/IP connection 22 and the RF connection 24 and stores any newly received information in its database 26. Upon determining that new information is received that is intended to be sent to the subscriber, the SN/IP sends the SCP 18 a message indicating that the SN/IP 20 has information required by the subscriber. In response, the SCP 18 sends a message instructing the SSP 14 to initiate a call to the subscriber. The SCP 18 may be configured such that the message to the SSP 14 is sent only in accordance with the preferences expressed by the caller.

The SSP 14, upon receiving instructions from the SCP 18, then connects the SN/IP 20 to the subscriber line. Instead of sending the SN/IP 20 extension number to the subscriber for display on the CID unit 17, the SN/IP 20 instead provides the information requested by the subscriber. The subscriber telephone then rings as if a call were being received such that the requested information is passed to the CID unit 17 in-between the rings as described above. It is to be noted that before sending the information, the SN/IP 20 formats the raw data such that the information is a valid CID data stream and that the information intended for the subscriber is able to be displayed legibly on the CID unit 17.

Obviously, many modifications and variations of the present invention are possible in light of the above teaching. Thus, it is to be understood that within the scope of the appended claims the invention may be practiced otherwise then is specifically above.

What is claimed is:

1. A system having an originating service switching point (SSP), the system for providing access to an information service over a telephone network comprising:
   a customer premise equipment (CPE) selectably in communication with said SSP, said CPE configured to receive a dial tone when said CPE is off-hook;
   a service node in communication with said SSP, said service node adapted to automatically receive and store content from said information service; and
   a processor adapted to enable said service node to provide said content as continuous audio instead of said dial tone to said CPE when said CPE is off-hook;
   wherein the content represents notification of email.

2. The system of claim 1, wherein the system comprises an advanced intelligent network (AIN) system.

3. The system of claim 1, further comprising a signaling transfer point (STP) in communication with said SSP and a switching control point (SCP) in communication with said STP, wherein said SCP includes said processor.

4. The system of claim 3, wherein the SCP is adapted to enable said service node to provide said content responsive to determining that a customer associated with said CPE is subscribed for said information service.

5. The system of claim 4, wherein the SCP is adapted to enable said SSP to provide a dial tone to the CPE responsive to determining that a customer associated with said CPE is not subscribed for said information service.

6. The system of claim 3, further comprising a terminating SSP in communication with said STP.

7. The system of claim 1, wherein the service node includes a TCP/IP interface for obtaining information from the Internet.

8. The system of claim 7, wherein the service node includes a radio frequency (RF) interface for obtaining information.

9. The system of claim 1, wherein the processor responds to an interrupt from the CPE by suspending the continuous audio.

10. The system of claim 9, wherein the processor responds to a recognized sequence of DTMF keys from the CPE following the interrupt by changing the content.

* * * * *

UNITED STATES PATENT AND TRADEMARK OFFICE
CERTIFICATE OF CORRECTION

PATENT NO. : 7,359,502 B2
APPLICATION NO. : 11/103323
DATED : April 15, 2008
INVENTOR(S) : Karen Jeanne Pelletier et al.

Page 1 of 1

It is certified that error appears in the above-identified patent and that said Letters Patent is hereby corrected as shown below:

On the Title page:

Item (75) Inventors should read as:
Karen Jeanne Pelletier, Crystal Lake, IL (US); Laura Marie Griffith, Dundee, IL (US); Michael Steven Pickard, Highland Park, IL (US); Gayle Roberta Ekstrom, Chicago, IL (US); Robert ~~Welsey~~ Wesley Bossemeyer, Jr., St. Charles, IL (US); Raymond Walden Bennett, III, Naperville, IL (US); Jordan Howard Light, Mt. Prospect, IL (US); Edmond W. Israelski, Lake Barrington, IL (US); Bruce Edward Stuckman, Algonquin, IL (US)

Signed and Sealed this

Twenty-second Day of July, 2008

JON W. DUDAS
*Director of the United States Patent and Trademark Office*